Oct. 28, 1924.　　　　　　　　　　　　　　　　　　1,513,589
G. W. DENISON
DIE FOR FORMING HOLLOW BLOCKS
Filed Sept. 6, 1921　　　　4 Sheets-Sheet 1

Patented Oct. 28, 1924.

1,513,589

UNITED STATES PATENT OFFICE.

GEORGE W. DENISON, OF BAY VILLAGE, OHIO.

DIE FOR FORMING HOLLOW BLOCKS.

Application filed September 6, 1921. Serial No. 498,890.

*To all whom it may concern:*

Be it known that I, GEORGE W. DENISON, a citizen of the United States, residing at Bay Village, in the county of Cuyahoga and State of Ohio, have invented a certain new and useful Improvement in Dies for Forming Hollow Blocks, of which the following is a full, clear, and exact description, reference being had to the accompanying drawings.

My invention relates to a die for forming hollow blocks for building purposes.

One of the general objects of the invention is to provide a die arranged to distribute the proper proportions of material into the different portions of the extruding end of the die so as to insure the formation of a block having its parts of equal density throughout and especially where hollow blocks are formed to insure that the transverse walls shall be of the same density. In the past great difficulty has been experienced because the hollow blocks formed by the extruding process have warped and cracked in the drying process. This I have found to have been due to the fact that the walls and particularly the transverse walls of the blocks were of differing density. This differing density was due to an improper proportionate feed of material to the several channels between the forming surfaces of the dies and core.

A feature of my invention for bringing about this result consists in the provision of positive guide means associated with or forming part of the die. The guide means may take many different forms and may or may not include an adjustable feature.

As an example I find that by providing a die of a peculiar form wherein the converging walls of the throat or mud receiving end are progressively warped to form guiding surfaces to effect the equitable distribution of the material as it approaches the final forming surfaces of the die, I can obtain an extruded product having a uniform density. I can accurately distribute the material in proper proportion to the extruding mouth. With this form of die I also prefer to provide positive initial directing means for proportionately dividing the material as it enters the throat of the die.

I also find it feasible to use guide means adjacent the extruding end of the die, such guide means being preferably adjustable and the most convenient manner for holding these guides is to place them on the cores or core bridge. A more convenient arrangement, however, would be to extend the inner ends of the cores inwardly the full length of the throat and terminate in cutting edges; the extensions being tapered in such a manner as to co-operate with the warped surfaces of the throat in properly dividing and guiding the plastic material to the die mouth.

Any one of the methods outlined may be utilized singly or in combination.

An additional feature of the adjustable guide device consists in the ready accessibility of the adjusting means, whereby they may be quickly adjusted without any disassembling of the die.

Another feature of my invention is the provision of a device adapted to accomplish the above results which may be easily assembled and disassembled, and is simple in construction. Further objects of the invention will be apparent in the course of the following description, and the features of novelty will be pointed out in the claims.

In the drawings, in which devices embodying the principles of my invention are illustrated, Fig. 1 is a side view of a die embodying one of the principles hereinbefore referred to; in Figs. 2, 3 and 4, only one-half of the die is illustrated, it being understood that the other half may be exactly the same in form. Fig. 7 is an end view of the die with the core in place; in Figs. 15 to 20, inclusive, I have illustrated a preferred form of die and core construction; Fig. 18 is a similar sectional elevation substantially along the line 18—18 of Fig. 15, while

Referring more particularly to the device as illustrated in Figs. 1 to 8, inclusive, the member 10 is a die member and is shown as provided with a suitable annular flange 16 having openings formed therein to receive bolts whereby it may be attached to the end of an extruding machine.

Figure 1:
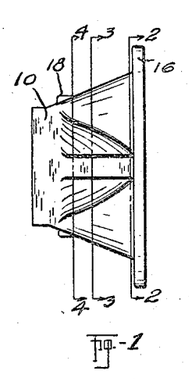
Figure 2:
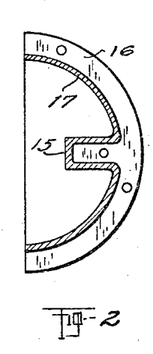
Fig. 2 is a sectional view taken on the line 2—2 of Fig. 1.
Figure 3:
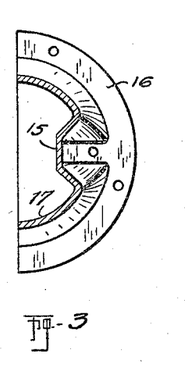
Fig. 3 is a sectional view taken on the line 3—3 of Fig. 1.
Figure 4:
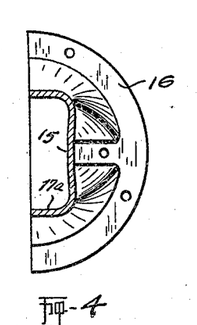
Fig. 4 is a sectional view taken on the line 4—4 of Fig. 1.
Figure 5:
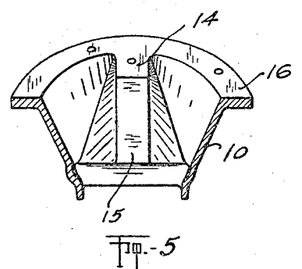
Fig. 5 is a sectional view of the die in perspective, a guide member being omitted.
Figure 6:
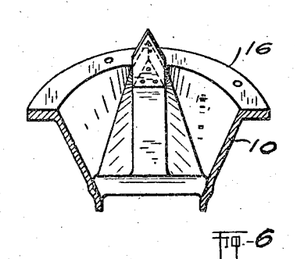
Fig. 6 is a similar view showing a guide member in place.

The form in which I prefer to make this die member will be better understood by reference to Figs. 1 to 4, inclusive. Referring specially to Fig. 2, it will be seen that near the receiving end the throat of the die is almost circular in cross section, but with two depressed portions on each side forming two radially extending walls 14 preferably in the same plane as the flange 16, and two axially extending walls 15. The distance between the parallel walls 15 should be greater than the height of the block to be formed. The walls of the die throat adjacent these parallel walls are warped so as to connect the walls with the undistorted portion 17 of the die throat and extending toward the extruding end of the die so as to finally merge in the sides of the rectangular part of the throat. The rectangular portion of the die throat may be larger than the rectangular opening of the extruding mouth. The relative proportion of these rectangular zones is clearly illustrated at 17ª and 17ᵇ in Fig. 8. The throat surfaces may be arranged to merge into the wall 17ª, as may be clearly seen by reference to Figs. 4 to 7 inclusive.

As the extruding end of the usual tile die is provided with a rectangular mouth it will be seen that such a die having parallel, warped and converging surfaces in the throat and in the relation just described will cause the die throat to direct the material forced into the die towards the ends of the rectangular mouth and to evenly distribute this material as it approaches the mouth.

On each of the radial walls 14 there may be mounted a guiding and cutting means, herein shown as comprising a wedge block 20 triangular in cross section; the base of each triangle abutting a wall 14. These blocks may be suitably secured to the walls by means such as the bolts 21. It will be seen that the sharp edge or ridge of these blocks cause the blocks to act as a separating means adapted to direct material on the warped surfaces formed at the sides of the axial walls 15 of the die.

The inner ends or faces of the blocks are preferably substantially flush with the axial walls 15 respectively, and a further guide and cutting means is shown consisting of the blades 22 attached to these faces. These blades have substantially a sharpened end extending parallel to the side walls of the triangle block so that these blades serve as an additional guide tending to throw any material which comes against their edges to one side or the other towards the channels of the die. Any material coming between the inner faces of these blades, however, is retained between the two blades and will be forced outward between the walls 15.

It will therefore be seen, that as the material is forced into the die, certain portions thereof will be directed toward the warped surfaces described and thereafter be distributed along the sides of the extruding mouth, while other portions will pass between the blades 22 and up to the central portion of the extruding end. This gradual converging of the throat surfaces of the die tends to cause a feed to the different portions of the mouth, of a quantity of material proportionate to the extruding area of the portion of the block to be extruded at that point thereby tending to insure the equal compression of the material at the different points which will cause the finished block to have walls of the same density throughout.

Figure 8:
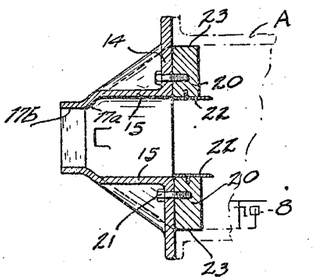
Fig. 8 is a section taken on the line 8—8 of Fig. 7, but showing the position of the die when on an extruding machine, the usual form of core being omitted for clearness.
Figure 9:
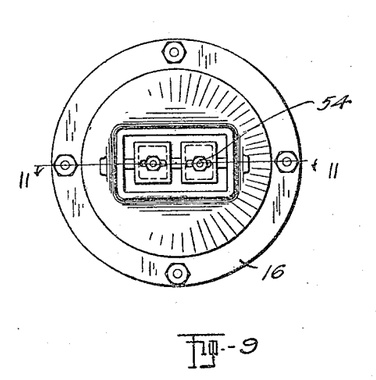
Fig. 9 is an end view of the usual form of die.

The end faces 23 of the block 20, which are opposite to the faces on which blades 22 are connected, may preferably be made arcuate in form so as to adapt them to snugly fit the mouth of an extruding machine A, as shown in Fig. 8.

The die member is shown as provided with recessed portions 18 which form interior shoulders whereby a core member may be conveniently inserted within the die. As the mode of attaching this core member is the same as that used in connection with one of the other forms of die illustrated, a further description of this attachment will be deferred and will be given in connection with this other form.

Figure 10:
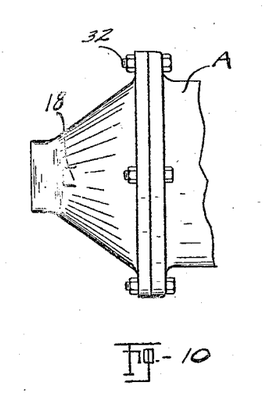
Fig. 10 is a side view thereof showing the die in attached position on an extruding machine.

Referring particularly to the form of device illustrated in Figs. 9 to 11 and 14, I herein show a die member 30 which may be provided with an annular flange 31 having suitable openings formed therein adapted to receive bolts 32 to attach the die to the mouth of an extruding machine, A, as shown in Fig. 10. The die, as herein shown, is substantially circular in cross section at the outer end of the throat and has the usual rectangular extruding mouth. The walls leading up to this mouth, are herein shown as substantially conical except as they are shaped toward the extruding mouth to conform to its rectangular form. This is the usual form of die.

No warped surfaces tending to feed the correct portion of material to the different parts, however, are shown in this form of die, but in order to bring about the correct feed of material I may rely upon adjustable guide means carried by the core member as will be subsequently described. Such adjustable guide means may, however, be used with the form of die shown in Figs. 1 to 8 inclusive so that the adjustable feature may be used either with a die having a positive guide means, or with the usual form of die.

The die 30 is provided with depressed portions 38 adjacent the ends of the rectangular mouth which form notches in the die throat supporting the ends of the core bridge 40 whereby the core may be readily placed in position in the die. The core may thus be maintained in proper relation to the die when the device is in operation. This arrangement of the core member in relation to the die is substantially the same as that employed in other forms of dies and this description of the attaching of the core therefore, applies also to the device illustrated in Figs. 1 to 8.

Figure 11:
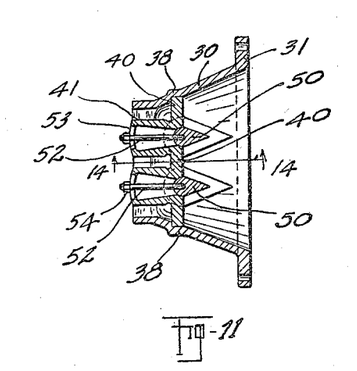
Fig. 11 is a sectional view of the die taken on the line 11—11 of Fig. 9 illustrating my invention as being adapted to a special form of core.
Figure 12:
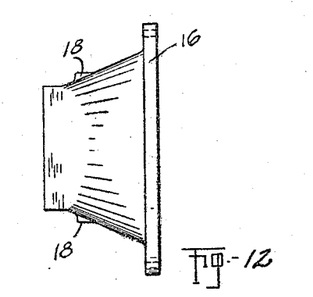
Fig. 12 is a plan view of the die.
Figure 13:
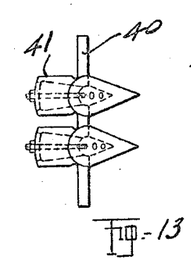
Fig. 13 is a side view illustrating the form of core member which may be used with either form of the die.
Figure 14:
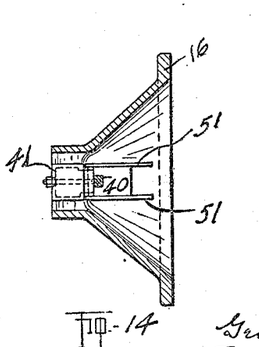
Fig. 14 is a sectional view taken on the line 14—14 of Fig. 11 showing the core in place.
Figure 15:
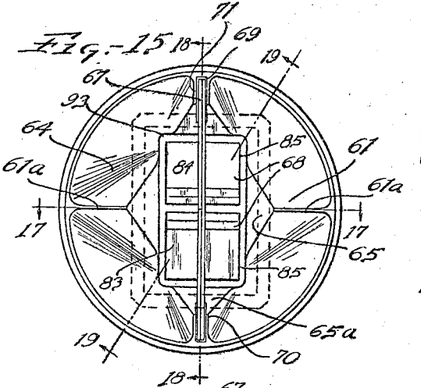
Fig. 15 is an end view of the throat of the die.
Figure 16:
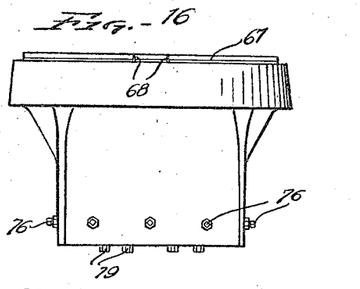
Fig. 16 is a side view of the same.
Figure 17:
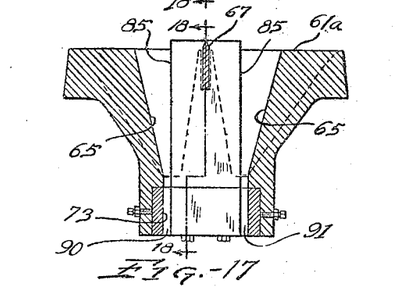
Fig. 17 is a cross sectional elevation taken substantially along the line 17—17 of Fig. 16.

The core member as illustrated, comprises the bridge 40 having the cores 41 integrally formed thereon. The core proper may be made of any form depending upon the size and shape of opening to be made in the blocks but are herein shown as substantially rectangular and may be preferably separated from each other a distance equal to the width of the middle wall of the tile being manufactured and the spaces between the sides of the rectangular mouth of the die and the core may be the same width so as to form a block having transverse walls of the same thickness. The inner ends of the cores are shown as provided with arcuate seats adapted to support complementary end surfaces of the guides 50. These guide members are substantially wedge shaped in a cross section taken parallel to the core bridge as seen in Figs. 11 and 13.

The sides of the guide member 50 are shown as having enlarged ears 51 of a shape similar to the other portion of the body, which ears form guides tending to hold any material which comes against their outer edge and thus directs it towards the sides of the extruding mouth. These ears may be made integral with or be suitably attached to member 50 as shown. Any material coming against the apex of the guide members will be directed either into one of the end transverse channels or the central transverse channel. The guide members are therefore adapted to be adjusted so as to deflect most of the material fed into the die throat toward the outer wall channels. This may be accomplished in the device shown by providing the bolts 52, secured to the guide members and extending outwardly through slots 53 in the cores; said slots running in a direction substantially longitudinal of the bridge. Lock nuts 54 may be threaded on these bolts and serve to lock the guide members in adjusted position by abutting the housing, as may be readily understood. In operation the material will be forced into the die throat from the extruding machine and will be gradually compressed as it approaches the extruding mouth of the die.

When this improved core is used with a die of the special form shown in Figs. 1 to 8, the material which comes against the sharp edge of the separating members 20 will be guided into the grooves formed by the warped surfaces adjacent the axially extending walls 15. This material will then be guided towards the ends of the extruding mouth. A large quantity of material will, of course, pass into the receiving mouth without striking the separating members. The central portion of the mass of material which passes between the guides 22, will pass through the throat undeflected until it is divided by the guides 50 positioned on the core bridge. It will, therefore, be seen that the material is positively guided and distributed to the different forming channels of the extruding mouth.

While the devices hereinbefore described illustrate practical embodiments of my invention, the arrangement of the parts therein however, is not such as will result in the greatest degree of efficiency in manufacturing tile having relatively thin webs. In Figs. 15 to 20 inclusive, I have illustrated a novel form of die and core construction which is adaptable to the obtaining of a uniform density in the mass as it is extruded through the die mouth and which has the further advantage of economy of construction and long life. In this form of die no adjustable mud dividing means is provided but wedges having knife edges may be formed integrally with the die throat walls and a core bridge constituting a dividing fence may serve to part the material as it enters the die throat.

The die body may be comprised of an integral casting having a throat and surfaces which are comprised of wedge-shaped guides 61 formed integrally therewith. These guides may terminate in knife edges 61ª at the receiving end of the throat and the side surfaces 62 may merge into the coniform throat surfaces 63; a substantial fillet or radius 64 being provided to join these inner surfaces. In place of the parallel walls 15 provided in the form illustrated in Figs. 1 to 8, I prefer to have tapered surfaces 65 converging inwardly toward the die mouth and terminating in the same plane as the surfaces 73 and 74. A core bridge 67 may be supported at the apexes of two of the wedges having diametrically opposite positions.

In this form of die there may be four guiding wedges having radially positioned cutting edges spaced substantially 90° apart. I prefer to position the core bridge at the receiving end of the throat in the manner described in order to effect a division of the material before it enters the die throat. The cores may be supported by wedge shaped extensions formed on the bridge.

This core bridge may be comprised of metallic plate 67 of relative thinness but of sufficient depth to rigidly maintain the tapered core supporting portions 68 in position irrespective of the pressure being exerted thereon when material is being extruded through the die. The bridge may be supported in slots 69 formed in the outer ends of the wedges 70 and 71. The bridge may be held in rigid relation with the die by any suitable means. I prefer however, to have the slots considerably greater in width than the width of the bridge, so as to obtain sufficient space between the bridge and the slot walls whence babbitt or similar metal may be poured into the slots after the bridge and cores have been properly adjusted.

The forming surfaces 73 and 74 of the die may be removable as the greatest depreciation occurs in the die due to a rapid corroding of the forming surfaces. To this end, I have provided a removable lining 75 comprised of an integral rectangular member formed of cast steel. Clamping means for maintaining the lining in place may be comprised of ordinary set screws 76 extending through the walls of the die and lock nuts 77. The forming surfaces 78 of the cores may likewise be replaceable, hence I have provided cores comprised of rectangular blocks secured to the tapered portions 68 of the bridge 67 by suitable means such as bolts 79.

Figure 18:
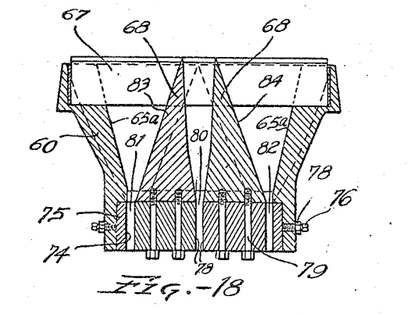
Figures 19, 20:
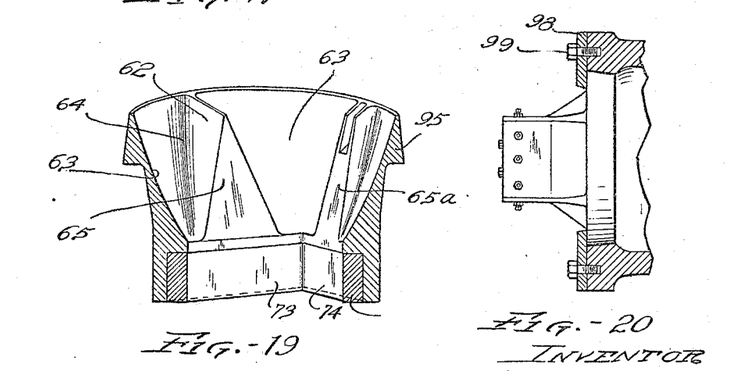
Fig. 19 is a transverse sectional elevation taken along the line 19—19 of Fig. 15, shown slightly in perspective.
Fig. 20 is a section taken through the extruding end of an auger machine illustrating the relative position of the die when attached thereto.

Positioning the forming surfaces of the cores with relation to the forming surfaces of the die lining may be simply effected by inserting spacing blocks between the respective surfaces after which the core bridge may be attached to the die as already described. By proportioning the core supports 68 of the core bridge as illustrated in Fig. 18 so that the apexes are positioned toward the center of the die, a sufficient amount of the material which is passing out of the auger machine to the die throat is directed to the central forming channels 81 of the core to obtain the same density in the middle web of the tile being formed as the density of the outer walls which are being formed in the channels 81 and 82.

In this figure, it is to be seen that the surfaces 83 and 84 slope toward the outer forming channels 81 and 82 respectively at substantially the same angle as the surfaces 65; thus causing the major portion of the material which would otherwise converge to the central channel, to be directed outwardly to the outer channels. The end surfaces 85 of the core wedges may be parallel and coaxially aligned with the end surfaces of the core blocks. Part of the material deflected inwardly by the surfaces 65ª will thus be directed between the core supports 68; while the remainder will be guided by the parallel surfaces 65 into the channels 90 and 91 which form the top and bottom webs of the tile.

In this form of die construction, it is to be readily seen that the knife edges will first divide the material and the wedges formed on the throat surfaces of the die will distribute it as it approaches the die mouth. The tapered surfaces of the wedges as well as the converging surfaces of the throat wall direct a considerable portion of the material to the corners 93 of the die mouth. Furthermore the major portion of the material is directed away from the central web channel 80 which heretofore had received too much with the result that the central tile web had a greater density than the density of the outer webs.

This form of die may have a tapered annular flange 96 adapted to fit a complementary surface 97 in the end of the auger machine. An annular ring 98 may serve to hold the die in position on the machine. Bolts 99 may maintain the ring 98 in position but may be of sufficient weakness to readily break in case the auger machine is started when the plastic material has been negligently permitted to dry in the die; thus preventing the destruction of the core bridge.

Figure 21:
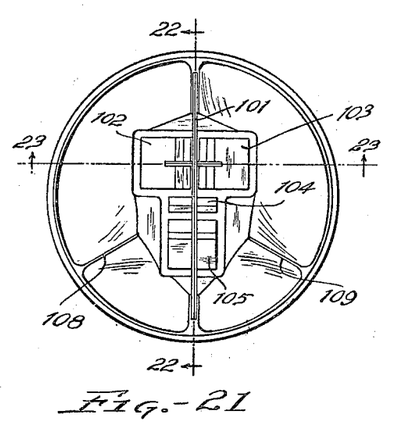
Figs. 21, 22 and 23 illustrate the arrangement of a die and core embodying the principles of my invention and which is particularly adaptable to the formation of a non-symmetrical die.
Figure 22:
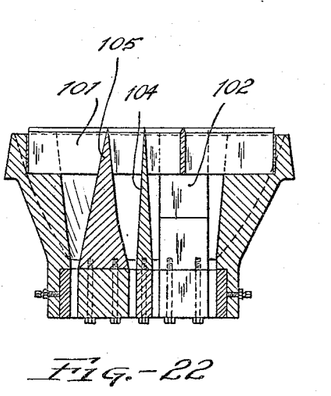
Figure 23:
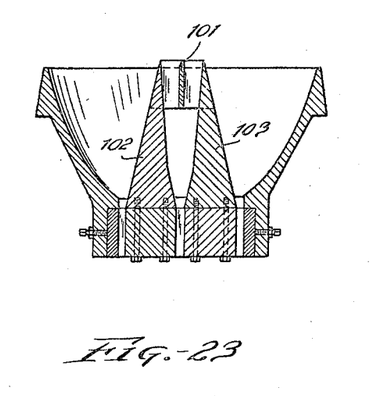
Figure 24:
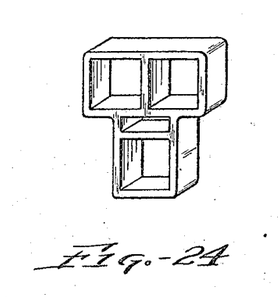
Fig. 24 is a perspective view of the tile formed by the die shown in Figs. 21, 22—23.

In Figs. 21, 22, and 23, I have illustrated the adaptation of the last described form of die to the manufacturing of T-shaped, three-void, or so-called interlocking tile shown in Fig. 24. The construction may be substantially the same as heretofore described. The wedges 108 and 109 positioned on each side of the bridge however, may be set at any desired angle to obtain the proper distribution of the material. In this case, the core member may constitute a core bridge 101 having wedge-shaped core supports 102, 103, 104 and 105 which are adapted to support removable rectangular core members in the manner heretofore described.

In adapting my principle to die designs it may be necessary to provide a greater or fewer number of the knife edged wedges depending upon the local frictional increases and decreases in the die throat. From the foregoing description of various embodiments of my invention, it is obvious that the function of the warped surfaces and wedge surfaces is to divide the material as it enters the throat of the die and to change the ordinary flow of material as it approaches the forming surfaces of the mouth. By associating knife edges with these various wedges and warped surfaces, it is practical to positively divert certain portions of the material towards the corners of the mouth so as to insure the feeding of the material to the forming channels in the mouth in such proportions that equal density in the walls of the tile is obtained during the formation thereof. Where a core of the form illustrated is used, material must of necessity pass around the core bridge. The bridge may therefore have a knife edge which will divide the material and thereby decrease the pressure exerted thereon. While it is practical to position the core bridge near the extruding end of the die, better results are obtained when the bridge is positioned at the receiving end of the die. Re-uniting of the material after being thus divided by the bridge is more readily obtained. Furthermore, a quantity of the material passing through each of the forming channels in the die mouth can be divided at the throat entrance to be proportionate to the cross sectional area of the channels. When adjustable means are provided on a core bridge positioned near the mouth of the die, the ease with which the position of the guides may be varied is quite apparent, as it is only necessary to loosen the nuts 54 and swing the ends of the rods 52 in the proper direction to obtain a variation in the direction of flow of the material as it approaches the extruding end of the die.

Any one of the foregoing described devices, insures the formation of a homogeneous block which when dried and burned in finishing process will be free from warps and cracks.

While I described specific embodiments of the invention, it will be apparent that many variations might be made therein and that other forms of devices involving the principles of my invention might be made. Therefore, the foregoing description is to be taken as illustrative of specific embodiments of the invention, rather than as illustrative of the character and scope thereof.

Having thus described my invention, I claim:

1. In a device of the class described, a die having an enlarged receiving end restricted on two sides, and an extruding end substantially rectangular in cross section, and having cutting means on the receiving end of the die adapted to direct material into the enlarged portions on the sides of the restricted part.

2. In a device of the class described, a die having a restricted extruding mouth, a wide receiving end, an axial wall extending from the extruding end to the receiving end, warped surfaces along each side of said wall adapted to direct material towards the ends of said mouth, and cutting means carried by the receiving end of said die, for cutting material and then directing material onto said warped surfaces.

3. In a device of the class described, a die having a restricted extruding mouth, a wide receiving end, axial walls extending from the walls of the mouth to the receiving end, radial walls on said end connected to the axial walls, warped surfaces along said axial wall, and cutting members mounted on said radial walls adapted to guide material onto the warped surfaces.

4. In a device of the class described, a die having a restricted extruding mouth, a wide receiving end, axial walls extending from the walls of the mouth to the receiving end, radial walls on said end connected to the axial walls, warped surfaces adjacent said axial wall, and wedge shaped cutting members mounted on said radial walls and adapted to guide material onto the warped surfaces.

5. In a device of the class described, a die having a restricted extruding mouth, a wide circular receiving end, axial walls of less width than the sides of the mouth and extending from them to the receiving end, radial walls on said end connected to the axial walls, warped surfaces at each side of said axial walls, and wedge-shaped cutting members mounted on said radial walls, adapted to direct material onto said warped surfaces, the inner ends of said wedges being substantially flush with said axial walls.

6. In a device of the class described, a die having a substantially circular receiving end, a substantially rectangular extruding mouth, an axial wall extending from each side of the rectangle to the receiving end, radial walls on said end connected to the axial walls respectively, warped surfaces formed in the throat of the die adjacent said walls and gradually shaped toward the mouth to conform therewith, whereby material may be distributed to portions of the mouth in correct proportion to the area of the block to be formed by such portions.

7. In a device of the class described, a die having an extruding mouth, a circular receiving end, cutting and separating means on said end adapted to direct material toward the corners of the mouth, passageways adjacent said guide means adapted to receive said material and distribute it to the mouth, said passageways being formed by warped surfaces extending toward the corners of said mouth to conform to the side thereof.

8. In a device of the class described, a die having a rectangular extruding end, a wide receiving end, a substantially axial wall extending from the extruding end to the receiving end, and passageways at each side of said wall adapted to distribute material along the sides of said mouth towards its corners, said passageways being formed by warped surfaces which gradually conform to the shape of the sides of the mouth.

9. In a device of the class described, a die having a substantially circular receiving end, a substantially rectangular extruding mouth, an axial wall running from the center of each side of the rectangle and extending to the said receiving end, radial walls on said end connected to the axial walls respectively, channels formed by warped surfaces on the sides of said axial walls and gradually shaped toward the mouth to conform therewith, whereby material may be distributed to portions of the mouth in correct proportion.

10. In a device of the class described, a die having a restricted extruding end to form a hollow column, a wide circular receiving end, an axial wall extending from the extruding end to the receiving end, and constituting depressions in said end, the walls of the die at each side of said axial wall being depressed and such depressions converging toward the corners of the mouth, whereby passageways are formed adapted to direct material toward the corners of the mouth.

11. In a device of the class described, a die having a restricted extruding end, separating means on the receiving end of the die adapted to direct material to portions of the die in approximate proportion to the material required in such portions, a core in said die, an adjustable member carried by said core and adapted to be adjusted to vary the amount of material fed to the sides thereof.

12. In a device of the class described, a core member, comprising a rod, a housing thereon, an adjustable deflecting member having an arcuate seat and mounted on the housing, an adjusting rod connected to said deflecting member and extending through a slot in said housing, and means for locking said rod in position.

13. In a device of the class described, a die having a core mounted therein, guiding means adjustably mounted in said core adapted to vary the proportion of material fed to the sides of the housing and stationary guides adjacent the receiving end of the die and adapted to feed material to the portions of the die in the approximate proportions of the final form of the die.

14. In a device of the class described, a die having an enlarged receiving end restricted on two sides, and a restricted extruding end substantially rectangular in cross section and adapted to form a hollow extruded column, separating means on the receiving end of the die adapted to direct material into the enlarged ends, and a core in said die having guiding means for directing material to the sides thereof, said means being adjustable to vary the proportion of material fed to the sides.

15. In a device of the class described, a die, a core member therein and adjustable deflecting means on the inner face of said core adapted to determine the proportion of material fed to the sides of the core.

16. In a device of the class described, a die having a restricted extruding mouth, an enlarged receiving end, shoulders stamped up from said die intermediate said ends, and a core member having its ends seated on said shoulders.

17. In a device of the class described, a die member having a core therein whereby a channel is formed between the die and core, a wedge-shaped guiding member seated on the inner face of said core and adapted to guide material to said channels, means for adjusting said member, including a rod extending through a slot in the core, and a nut for locking said guide member in position.

18. In a device of the class described, a core member having a wedge-shaped guiding member adjustably mounted on the inner end thereof.

19. In a device of the class described, a die having a core mounted therein, guiding means adjustably mounted in said core and adapted to vary the proportion of material fed to the sides of the core.

20. In a device of the class described, a core member, having adjustable means thereon for guiding material to its sides.

21. In a device of the class described, a core member, comprising a rod having a housing thereon, an adjustable deflecting member mounted thereon, and means for holding said member in adjusted position.

22. In a device of the class described, a die having an enlarged receiving end, a restricted extruding mouth, knives associated with the receiving end of the die adapted to proportionately divide the material forced therethrough and having surfaces extending from said knife edges and converging toward the corners of the die mouth whereby a proportionate amount of material being extruded may be deflected to the corners of the die mouth.

23. In a device of the character described, a die having a restricted extruding mouth adapted to the forming of a hollow extruded column, an enlarged receiving end having knives associated therewith, a converging throat extending from the receiving end to the die mouth comprised of a series of warped surfaces extending from said knives and converging toward the extruding channels of the die mouth whereby material passing through the die may be proportionately divided and be distributed to the various extruding channels of the die mouth.

24. In a device of the character described, a die adapted to form a hollow extruded column and having a plurality of knives positioned in the receiving end of the die for dividing the material passing therethrough, and having a core associated with the mouth of the die comprised of a bridge member having a plurality of wedge-shaped portions formed integrally thereon and adapted to support removable core plugs positioned in the mouth of the die.

25. In a device of the class described, a die having knives associated with the receiving end thereof positioned to proportionately divide the material forced therethrough and wedges formed in the throat of the die having surfaces adapted to guide some of the material toward the forming corners of the die mouth.

26. In a device of the character described, a die having a restricted extruding mouth for forming a hollow extruded column, an enlarged circular receiving end having knives transversely positioned therein, a converging throat extending from the receiving end to the die mouth having a series of wedge surfaces extending from said knives and converging toward the extruding channels of the die mouth whereby material passing through the die may be proportionately divided and be distributed to the various extruding channels of the die mouth.

27. In a device of the character described, a die adapted to the formation of a hollow extruded column having dividing knives positioned transversely of the path of the material passing through the die, a core bridge constituting one of the knives housing a plurality of knife edged and wedge shaped portions extending toward the die mouth, converging surfaces formed in the die throat extending from some of the knives to the die mouth and adapted to cooperate with said core wedges in proportionately distributing the divided material to the various extruding channels of the die mouth.

28. In a device of the character described, a die adapted to form a hollow extruded column, a plurality of knives positioned in the receiving end of the die for dividing the material passing therethrough, and a core bridge associated with the receiving end of the die having a plurality of knives and wedge-shaped portions for dividing and distributing the material entering the central zone of the die throat to the various forming channels of the die mouth.

29. In a device of the class described, a die having a restricted extruding mouth, a wide receiving end, the walls of said die gradually converging to conform to the shape of said mouth, and having inwardly projecting wedge shaped portions formed in the throat thereof, the apex of each wedge comprising a cutting edge, the side surfaces of the wedge-shaped portion extending from the apex to the end of the mouth, whereby material is cut and thereafter directed from the center of the die towards the ends of the mouth.

In testimony whereof, I hereunto affix my signature.

GEORGE W. DENISON.